United States Patent
Hovmand

(10) Patent No.: US 11,767,946 B2
(45) Date of Patent: Sep. 26, 2023

(54) GUIDE CLAW AND A METHOD OF ARRANGING A PUMP ON A BASE

(71) Applicant: Grundfos Holding A/S, Bjerringbro (DK)

(72) Inventor: Per Hovmand, Bjerringbro (DK)

(73) Assignee: Grundfos Holding A/S, Bjerringbro (DK)

(*) Notice: Subject to any disclaimer, the term of this patent is extended or adjusted under 35 U.S.C. 154(b) by 119 days.

(21) Appl. No.: 17/369,636

(22) Filed: Jul. 7, 2021

(65) Prior Publication Data
US 2022/0026011 A1 Jan. 27, 2022

(30) Foreign Application Priority Data

Jul. 8, 2020 (EP) .................................. 20184759

(51) Int. Cl.
| | |
|---|---|
| *F04D 13/08* | (2006.01) |
| *F16L 23/18* | (2006.01) |
| *F16M 1/00* | (2006.01) |
| F04D 29/66 | (2006.01) |
| F04D 29/60 | (2006.01) |
| F04D 29/62 | (2006.01) |
| F04D 3/00 | (2006.01) |

(52) U.S. Cl.
CPC .............. *F16M 1/00* (2013.01); *F04D 3/00* (2013.01); *F04D 13/086* (2013.01); *F04D 29/607* (2013.01); *F04D 29/628* (2013.01); *F04D 29/669* (2013.01); *F16L 23/18* (2013.01); *F16M 2200/08* (2013.01)

(58) Field of Classification Search
CPC . F16L 23/18; F16L 23/16; F16M 1/00; F16M 2200/08; F04D 29/607; F04D 29/605; F04D 29/608; F04D 29/086; F04D 3/00; F16J 15/022; F16J 15/025; F16J 15/121
See application file for complete search history.

(56) References Cited

U.S. PATENT DOCUMENTS

| | | | | |
|---|---|---|---|---|
| 3,771,915 A | * | 11/1973 | Back ..................... | F04D 29/607 417/360 |
| 3,880,553 A | * | 4/1975 | Wolford ................ | F04D 29/607 417/361 |
| 4,392,790 A | * | 7/1983 | Shibata ................. | F04D 29/607 417/360 |
| 4,726,742 A | * | 2/1988 | Harbison .............. | F04D 29/607 417/361 |
| 5,507,628 A | * | 4/1996 | Masse ................... | F04D 29/607 417/423.15 |

(Continued)

FOREIGN PATENT DOCUMENTS

| | | |
|---|---|---|
| JP | H08312575 A | 11/1996 |
| JP | 2003049798 A | 2/2003 |

(Continued)

*Primary Examiner* — Tan Le
(74) *Attorney, Agent, or Firm* — McGlew and Tuttle, P.C

(57) ABSTRACT

Some particular preferred embodiments relate to the field of pumping stations for sewage and wastewater with submersible pumps mounted in the bottom of the wells. To allow easy cleaning and maintenance of the pumps without getting in contact with the dirty water the solution is a system for easy lifting of the pump out of the well and lowering the pump again with an auto coupling.

26 Claims, 12 Drawing Sheets

(56) References Cited

U.S. PATENT DOCUMENTS

2010/0215515 A1    8/2010  Andersson
2010/0289261 A1    11/2010 Yang

FOREIGN PATENT DOCUMENTS

| KR | 100728865 B1 | | 6/2007 |
| KR | 20110105567 A | * | 3/2010 |
| KR | 20120139379 A | | 12/2012 |

* cited by examiner

Resonance Free Operation Only in Speed Ranges 50-60% and 82-110%

Resonance Free Operation in Full Speed Ranges 50-110%

GUIDE CLAW AND A METHOD OF ARRANGING A PUMP ON A BASE

FIELD OF THE INVENTION

In some particular preferred embodiments, the invention relates to the field of pumping stations for sewage and wastewater with submersible pumps mounted in the bottom of the wells. To allow easy cleaning and maintenance of the pumps without getting in contact with the dirty water the solution is a system for easy lifting the pump out of the well and lower it again called an auto coupling.

A guide claw is fixed to the pump guiding the pump during lifting/lowering on e.g. guide rods and connecting the pump to a base fixed to the bottom of the well. In the lower position, the pump is via the guide claw rigidly connected in upper and lower contact points on the base using the gravity to create the contact force. Lifting the pump unloads the contact forces. To support the pump in transverse direction either the upper or the lower contact is to be split in two to take up the reactions.

BACKGROUND OF THE INVENTION

In some practical implementation of a pump support where the pump is located in a general in-accessible position such as a pump well, repair or service of the pump support and in particular the pump (motor and pump house with impeller(s)) is often very difficult due to limited space and by being submerged. One solution is to arrange the pump on a base part in a manner, where the pump is fixed on the base part due to gravity acting on the pump. To allow easy cleaning and maintenance of the pumps without getting in contact with the dirty water the common solution is a system for easy lifting the pump out of the well and lower it again called an auto coupling. A guide claw is fixed to the pump guiding the pump during lifting/lowering on guide rods and connecting the pump to a base fixed to the bottom of the well. In the low position the pump is via the guide claw rigidly connected in upper and lower contact points on the base using the gravity to create the contact force. Lifting the pump unloads the contact forces. To support the pump in transverse direction either the upper or the lower contact needs to be split in two to take up the reactions. However, such arrangement of a pump on a base part gives rise to a number of problems where one of the more prone problems is the occurrence of vibrations.

Often it is desired to be able to operate the pump with variable frequency drives in a wide speed range without too high vibration levels that could damage the pump or pump control:

Traditionally the pumps have been operated at constant rotational speed defined by the alternating frequency of the power supply and the pol number of the motor. However, it has become increasingly popular to use variable frequency drives (VFD) because of the potential to save energy.

When designing auto couplings for systems to operate with VFD it is a challenge to avoid resonances resulting in too high vibrations that can reduce the reliability of the pumps and control system. Resonances occur when dynamic forces e.g. unbalance or blade pass frequencies excite natural frequencies in the structure. Natural frequencies are related to stiffness divided by mass. In a state of the art auto coupling there will be one or more natural frequencies that will be excited when operating with VFD with reduced rotational speed. This can cause reliability problems causing extra cost and down time. The common way to overcome the problem has been to avoid rotational speed ranges exciting resonances, but this is limiting the available speed range and thereby the energy saving Hence, an improved arrangement of a pump on a base part would be advantageous and in particular a more efficient and/or reliable arrangement of a pump on a base part would be advantageous.

OBJECT OF THE INVENTION

An object of the invention is to avoid resonances when operating a pump with variable frequency drives and thereby improve the energy saving and improve reliability.

It is a further object of the present invention to provide an alternative to the prior art.

SUMMARY OF THE INVENTION

The invention relates in a first aspect to a pump support, preferably comprising
- a base part having a lower end and an upper end, said base part comprising an end face,
- a guide claw adapted for carrying a pump and being configured for releasable arranging the pump on the base part at the end face, the guide claw comprising a first guide member,
- wherein the base part comprising
- a lower support part at the lower end configured for supporting a pump in a non-resilient manner in longitudinal direction towards the base part and vertical direction towards the lower end;
- an upper support part having a support surface at the upper end configured for receiving said first guide member and supporting said first guide member in an abutting engagement with a resilient element positioned in between the upper support part and the first guide member, so that when gravity acts on the pump, the guide claw is resiliently supported at support surface of the upper support part.

With the present invention the full desired variable rotational speed range might be used without resonances.

Guide claw as used herein is preferably used to reference an element forming a claw. Typically and preferably, the elements of making-up the claw is non-moveable in relation to each other, thus not forming a clamping force by forcing opposite members toward each other.

In some particular preferred embodiments, the invention relates to the field of pumping stations for sewage and wastewater with submersible pumps mounted in the bottom of the wells. To allow easy cleaning and maintenance of the pumps without getting in contact with the dirty water the common solution is a system for easy lifting the pump out of the well and lower it again called an auto coupling.

A guide claw is fixed to the pump guiding the pump during lifting/lowering on e.g. guide rods and connecting the pump to a base fixed to the bottom of the well. In the low position the pump is via the guide claw rigidly connected in upper and lower contact points on the base using the gravity to create the contact force. Lifting the pump unloads the contact forces. To support the pump in transverse direction either the upper or the lower contact is split in two to take up the reactions.

Resilient as used herein, is typically although non-limiting used to reference a resilient material such as elastomers typically being non-linear materials, a hyperelastic material and/or materials having a Young's modulus up till a strain of 10% around 2-5 MPa.

Non-resilient as used herein, is typically although non-limiting used to reference a material having Young's modulus in the range of 100,000-170,000 MPa.

In many preferred embodiments of the invention, resilient parts typically has a stiffness of less than ½₀,₀₀₀ of the non-resilient parts.

In some preferred embodiments, the guide claw may comprise a second guide member preferably arranged at a lower position of the guide claw and being configured to be received by said lower support part.

In some preferred embodiments, the pump support may further comprise a tubular mount element preferably configured to be arranged at an outlet of the pump, the tubular mount element preferably comprise a second guide member preferably arranged at a lower position of the guide claw and preferably being configured to be received by said lower support part.

In some preferred embodiments of the pump support, a second guide member may be arranged preferably at a lower position of an outlet section of the pump and may be configured to be received by said lower support part.

In some preferred embodiments of the pump support, at least a part of the guide claw may extend from the pump.

In some preferred embodiments of the pump, the guide claw may be mounted on or made integral with preferably an upper side of an outlet pipe of pump.

In some preferred embodiments of the pump support:
the guide claw may comprise two of the first guide members, preferably arranged with a distance in between them, and preferably a single of the first guide members, and
the base part may comprise two of the upper support parts preferably arranged with a horizontal distance in between them.

In some preferred embodiment of the pump support, the support surface may be vertical or may form an angle relative to vertical preferable by an amount of less than 15 degrees, such as less than 10 degrees, preferably less than 5 degrees and larger than 0 degrees.

In some preferred embodiment of the pump support, a pump may be arranged on the guide claw and the pump preferably comprises a pump house preferably configured for housing an impeller and preferably being arranged on said guide claw.

In some preferred embodiments of the pump support, the lower support part may have a second vertical support surface and a second horizontal support surface and wherein the second guide member of the guide claw may comprise
a second vertical abutment surface preferably configured to abut the second vertical support surface, so as to support a pump in longitudinal direction towards the base part,
a second horizontal abutment surface preferably configured to abut the second horizontal support surface, so as to support the pump in vertical direction towards the lower end.

In some preferred embodiment of the pump support. the support surface may be inclined upwardly preferably towards the end face, and the first guide member may have a vertically inclined abutment surface preferably inclined so as to be parallel with or substantially parallel with the inclination of the support surface, wherein the resilient element is arranged in-between the support surface and the vertically inclined abutment surface.

In some preferred embodiments of the pump support the upper support part may comprise a first horizontal support surface preferably configured for supporting the resilient element preferably by abutment in a horizontal plane.

In some preferred embodiments of the pump support, the upper support part may comprise a vertical extending lateral guide surface preferably for supporting the resilient element preferably by abutment in lateral direction, wherein lateral, preferably, is the horizontal direction perpendicular to the longitudinal direction of the pump support.

In some preferred embodiments of the pump, the first guide member may form a cavity preferably open ended in downward direction preferably configured for receiving the upper support part and the base part at its upper end may be inclined upwardly preferably away from the end face.

In some preferred embodiments of the pump support, the guide claw may be made integral with or may be releasable connected to the pump housing.

In some preferred embodiments of the pump support, the resilient element may be attached to one of the guide claw or the base part.

In some preferred embodiments of the pump support, the resilient element may be made partly or fully from an elastomer, hyperelastic material, preferably with metal plates forming one or both outer abutment surfaces, wherein said metal plates preferably are bonded by vulcanization.

In some preferred embodiments of the pump support, the guide claw may comprise one or more guide openings preferably configured for co-operating with one or more vertically arranged guide bars so that the guide claw may slide guided along said guide bar(s):
in a vertically downwardly motion so that the lower support part receives said second guide member, and the upper support part receives said first guide member and
in a vertically upward motion so that the second guide member departs from the lower support part and the first guide member departs from the upper support part.

In some preferred embodiments of the pump support, the base part may comprise a fluid channel having an inlet arranged in fluid communication via a through-going opening preferably provided in the guide claw or said tubular mount element and at the other end forming an outlet, wherein said guide claw or said tubular mount element may be arranged with its through-going opening forming a fluid passage between the pump, when arranged on the base part, and the fluid channel of said base part.

In some preferred embodiment of the pump support, the though-going opening of the guide claw may be configured for providing a fluid seal against said end face of the base part.

In some preferred embodiments of the pump support, the outlet section may be configured for providing a fluid seal against said face of the base part.

In some preferred embodiments of the pump support the fluid seal may be provided by a seal ring.

In a second aspect, the invention relates to a method of providing a pump support according to the first aspect of the invention, wherein the base part is mounted on a pump support carrying member, the method preferably comprises
providing a pump with the guide claw,
lowering said guide claw toward the base part to provide that
the lower support part has received and support said second guide member, and the upper support part has received said first guide member with a resilient element in between the upper support part and the first guide member.

In a third aspect, the invention relates to a method of dismantle a pump provided with a guide claw from a base part of a pump support according to the first aspect of the invention, the method preferably comprises raising said guide claw away from the base part.

In some preferred embodiments of the method, the lowering or the raising may be carried out along guide bars. The guide bars may preferably be arranged prior to the lowering or raising.

BRIEF DESCRIPTION OF THE FIGURES

The present invention and in particular preferred embodiments thereof will now be described in greater details with reference to the accompanying figures. The figures show ways of implementing the invention and are not be construed as being limiting to other possible embodiments falling within the scope of the attached claim set.

FIG. 1B is a close up view of FIG. 1A and FIG. 1C illustrates the pump support from a different perspective than FIG. 1A and with the guide bars and motor of the pump removed, FIG. 5B is a close-up view of a detail of the illustration of FIG. 5A (kindly observe that the view is rotated 180 degrees relatively to the view of FIG. 1). As will be detailed below, the seal ring has a certain degree of flexibility to allow easy deformation during the arrangement of the guide claw on the base part (as disclosed e.g. in FIG. 4) and to prevent addition of stiffness into the connection between pump and base part, FIG. 6a is a side view and FIG. 6b is a top view and FIG. 6c is a perspective view.

DETAILED DESCRIPTION OF AN EMBODIMENT

Figure 1A:
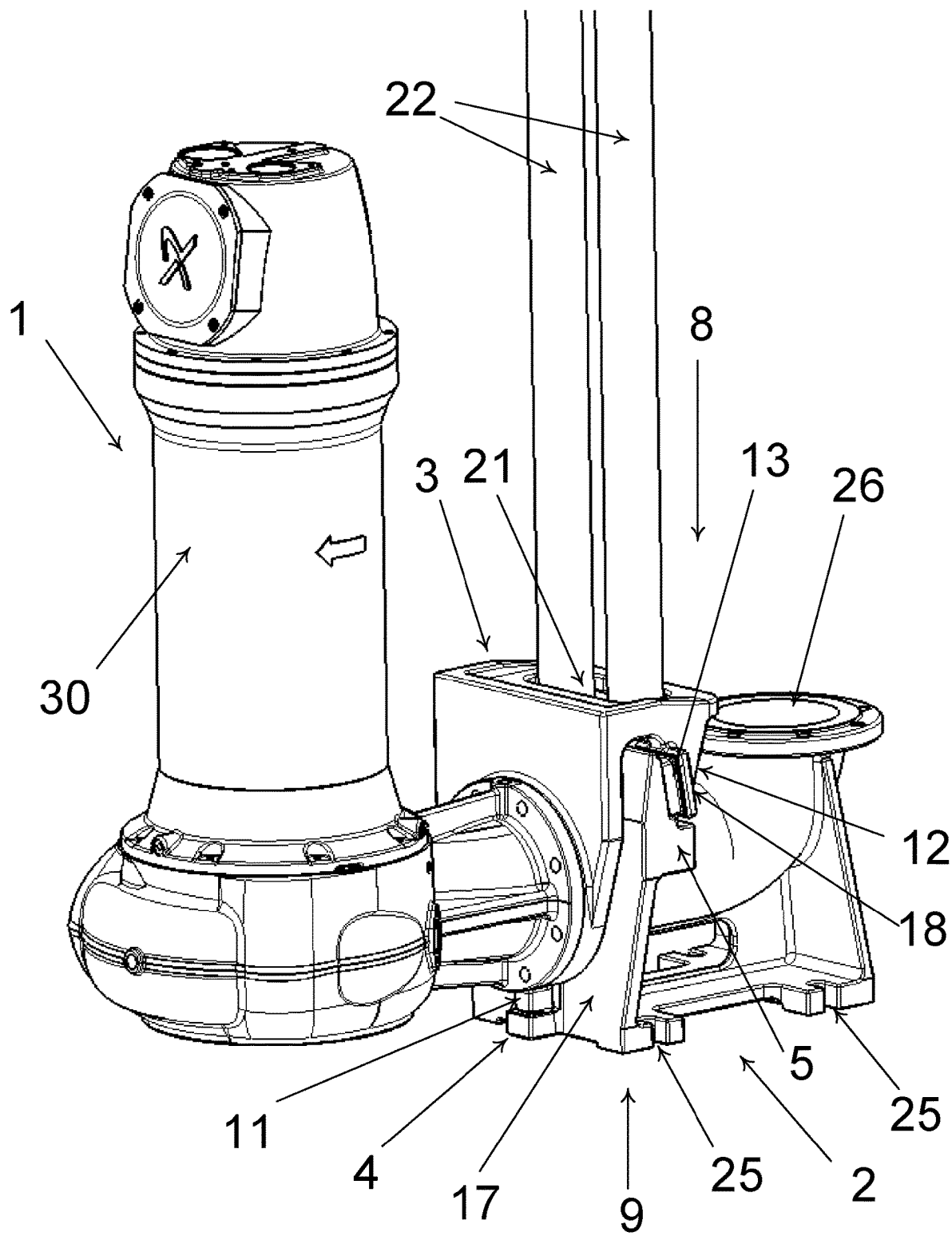
FIGS. 1A, 1B and 1C illustrate a preferred embodiment of a pump support according to the present invention; where
Figure 1B:
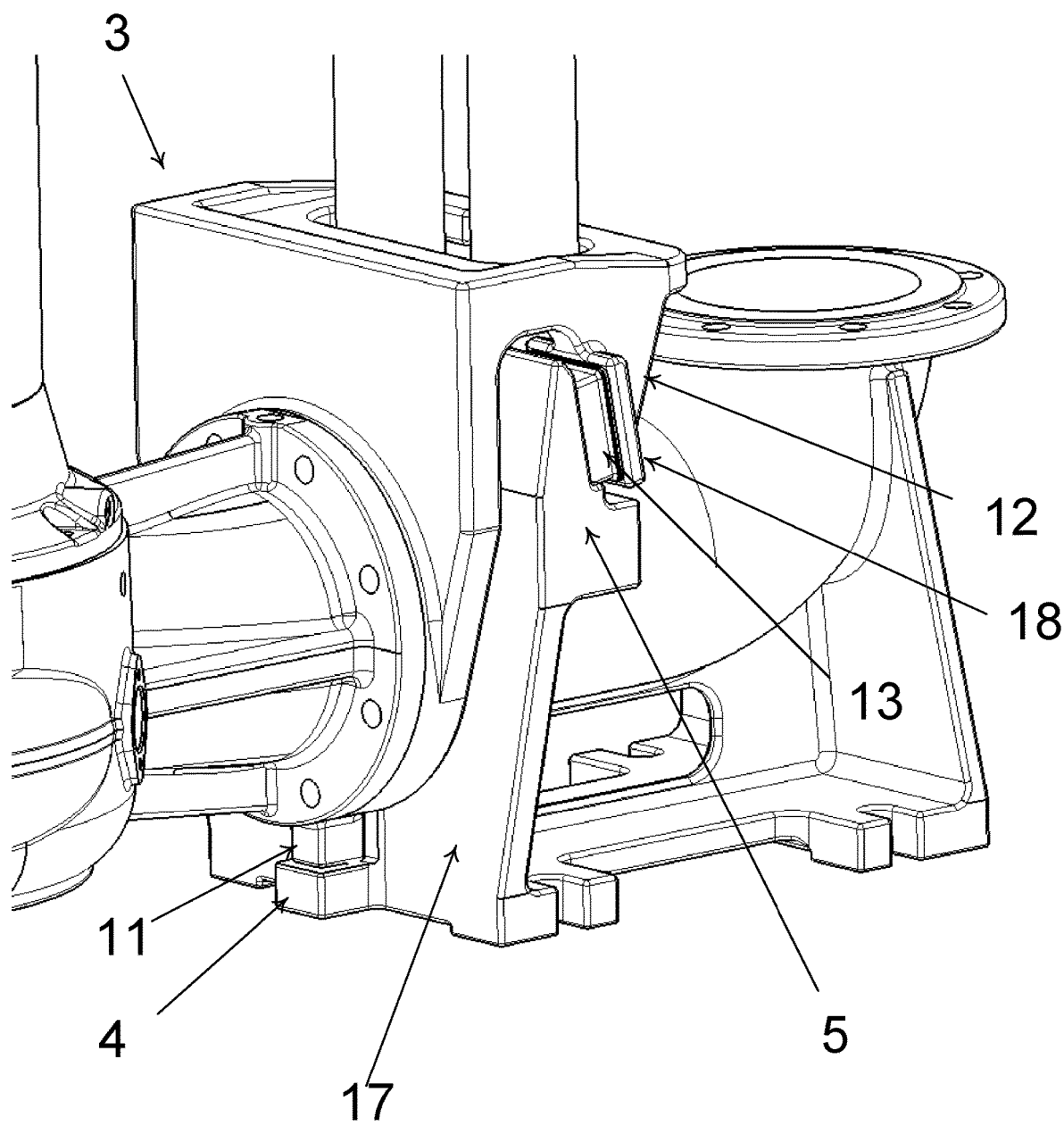
Figure 1C:
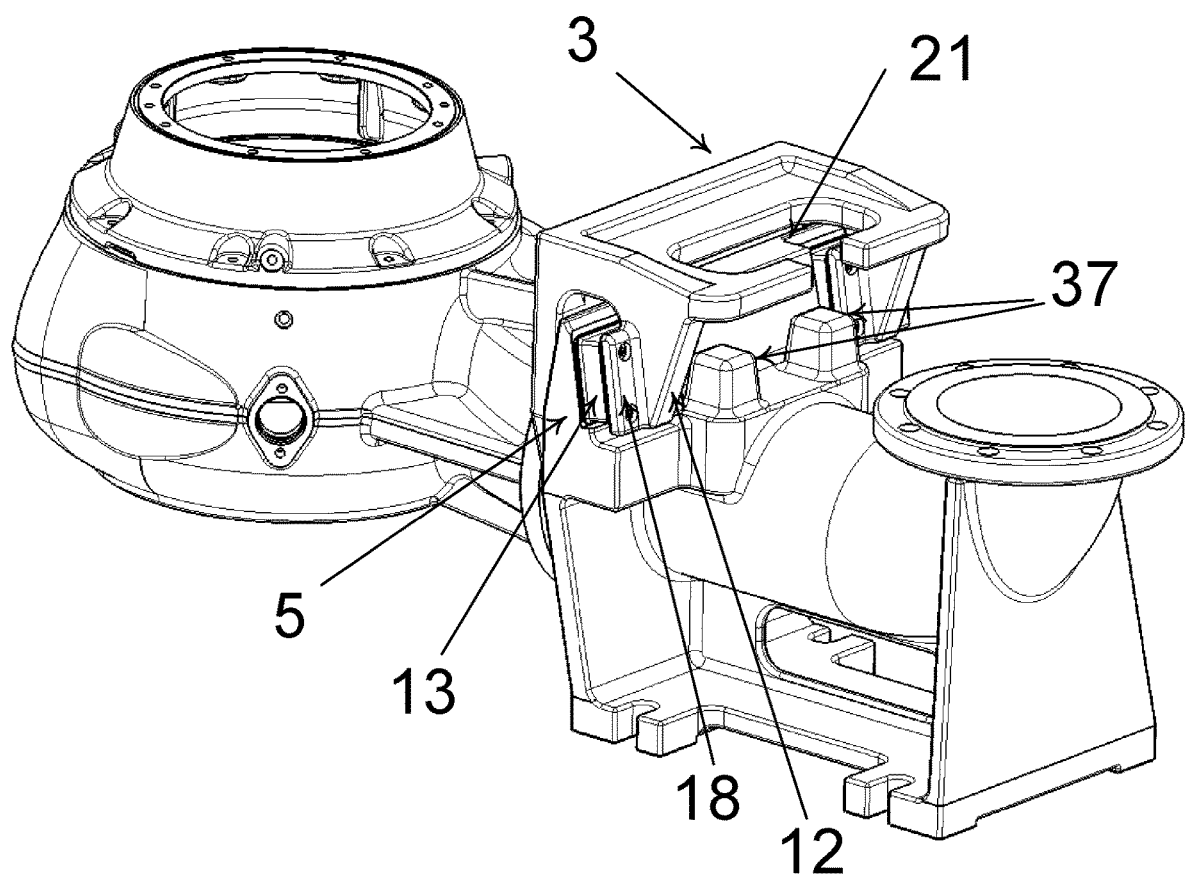

Reference is made to FIGS. 1A, 1B, 1C. These figures illustrate a preferred embodiment of a pump support. The pump support may have a longitudinal direction which in the embodiment shown is aligned with the flow direction out of the pump and into the pipe of the base.

The pump support as illustrated has a base part 2 with a lower end 9 and an upper end 8 wherein the base part 2 is configured for mounting the pump support at its lower end 9 to a pump support carrying member such as a floor. In FIG. 1, indentations 25 are provided which are used to receive bolts screwed into the carrying member thereby mounting the base part 2 to the carrying member 10. In some embodiments, a resilient element may be arranged between the base part 2 and the carrying member 10.

The base part comprising an end face 17. As illustrated in FIG. 5, the end face 17 forms an opening into a tubular section of the base part 2, which opening forms an inlet for liquid received from the pump. During use of the pump support, fluid flows through the opening in the end face 17, through the tubular section and leaves the base part 2 through the opening 26 in the base part forming an outlet. As will be disclosed further below, a pipe is connected to the base part 2 at the opening 26 to pump the fluid pumped to a position distant to the base part 2.

The pump support further comprises a guide claw 3 adapted for carrying a pump 1. The pump is connected to the guide claw via outlet pipe of the pump 1. As perhaps most clearly visible in FIG. 5, the guide claw 3 has a section interposed between a flange of the pump and the base part so that the fluid flows out of the pump 1, through the through going opening 24 and into the channel provided in the base part 2. As disclosed herein, a seal ring 28 is disposed between the guide claw 3 and the based part 2. The pump 1 is illustrated as being bolted to the guide claw 3, but may be attached to the guide claw 3 in other ways, such as being made integral with the guide claw 3. Accordingly, in some preferred embodiments, the guide claw 3 forms part of a channel leading fluid from the pump 1 to the opening 26.

The pump house forms as illustrated an internal void inside which an impeller (or a number of impellers) is arranged (not shown). The impeller is driven by an electrical motor 30 (see FIG. 1) such as by the impeller arranged on the rotational shaft of the motor. When the pump support is configured with a motor and impeller(s), the housing of the motor is arranged at the upper opening of the pump house 1 in a sealed manner. The pump 1 further comprising a fluid inlet arranged below the impeller(s) so that upon activation of the motor, the impeller(s) will pump fluid through the inlet through impeller(s) and deliver fluid to the tubular section of the base part 2 through the outlet pipe of the pump and through the opening in the guide claw 3.

The guide claw 3 is configured for connecting the pump 1 with base part 2 at the end face (17). The connection is a releasable connection and in order to assure inter alia that guide claw 3 is positioned on base part 2 so that the outlet of the pump 1 mate with the opening of the base part 2 (the position shown in FIG. 5) the guide claw 3 has been provided with a second guide member 11 and a first guide member 12. However, as noted in connection with FIG. 6 the second guide member 11 can be arranged at other positions that on the guide claw 3.

The base part 2 has been provided with support parts co-operating with the guide members. A lower support part 4 at the lower end 9 is provided and configured for supporting a pump a non-resilient manner in longitudinal direction towards the base part 2 and vertical direction towards the lower end 9. The lower support part acts as an end-stop in the sense that when the guide claw 3 is arranged on the base part 2, the movement of the lower part of guide claw 3 downwardly and towards the base part 2 is prevented. By non-resilient manner is preferably meant that no resilient material is arranged between the second guide member 11 and the lower support part 4.

At the upper end 8 of the base part 2, an upper support part 5 is arranged. The upper support part 5 has a vertically inclined support surface 16 and the upper support part 5 is configured for supporting said first guide member 12. It is emphasized that the support surface 16 may not be vertically inclined, and can be vertical. During normal operation, there is no direct contact between the support surface 16 and the first guide member 12 since a resilient element 13 is placed in between these two.

As illustrated, the first guide member 12 is arranged in a retracted position relatively to a front part of the guide claw 3 and protrude downwardly thereby providing an opening for the upper support part 5 to extend in, when the guide claw 3 is arranged on the base part 2. The first guide member 12 extends inclined downward whereby the opening in which the upper support part 5 is arranged is tapering in upward direction. If the support surface 16 is not inclined the first guide member 12 preferably extends non inclined and vertically. The resilient element 13 is fixed either on the upper support part 5 or on the first guide member 12. Thereby the resilient element 13 does not fall off, when the guide claw is lifted.

The tapering between the upper support part 5 and the first guide member 12 allows for easy maneuvering of the guide claw 3 when being positioned on the base part 2 and typically assures that the guide claw is not stuck in an unintended position on the base part 2. Further, the first guide member 12 is in engagement with a resilient element 13 arranged in between the upper support part 5 and the first guide member 12, so that the when gravity acts on the pump 1, the guide claw 3 is resiliently forced towards the support face 16. The reacting moment is taken up by the contact points of the second guide member 11 and the first guide member 12.

A further effect of the tapering is that the upper support part 5 will be guided into engagement with the first guide member 12 with the resilient element 13 in between when the guide claw 3 is lowered downwardly onto the base part 2.

The resilient element(s) 13 plays an advantageous role in connection with the present invention in order to provide elasticity to the pump support to move the lowest eigenfrequency below the lowest excitation frequency of the pump to avoid resonance. The cause of such resonance is often the rotation of the impeller(s) and/or motor which may excite one or more eigenfrequencies of the pump support. If resonances are not avoided even small dynamic forces from imbalance or blade pass will be amplified causing vibration levels that can cause reliability problems in pump and pump control. This is undesirable and the combination of the guide members 11, 12 the resilient element 13 and the support parts 4, 5 are devised to avoid or at least mitigate the risk of such undesirable effects.

As disclosed above, the lower support part 4 receives the second guide member in a non-resilient manner and restrains the movement of the second guide member 1 in longitudinal direction towards the base part 2. The second guide member 11 may be moved horizontally in a direction away from the base part 2 when the pump is moved away from the base part 2, but this movement is prevented or at least minimised by the weight of the pump 1 during operation of the pump 1. This stiff connection together with the resilient element 13 is found to be important to obtain a resonance free operating range of the pump 1.

At the upper part, the insertion of the resilient element 13 in-between the first guide member 12 and the upper support part 5 provides a resilient connection between the guide claw 3 and the base part 2. This set-up provides a substantially stiff lower fixation of the guide claw 3 and a substantially resilient upper fixation of the guide claw 3 to the base part 2 allowing some degrees of movement of the guide claw relatively to the base part 2. The result of this is typically that some of the eigenfrequency(ies) of the guide claw 3 including pump 1 is altered, such as lowered. In some specific embodiments, not all eigenfrequencies are lowered, but the three lowest eigenfrequencies are lowered while maintaining the upper eigenfrequencies high, resulting in the desired broad frequency range with no eigenfrequencies. The lower natural frequencies can be calculated for the pump mass incl. water and guide claw 3 supported by a pivot point at 11 and the stiffness of the resilient elements 13, defined by the Young's module and dimensions. While it is possible to calculate the characteristic of the resilient element 13 (Young's module, dimensions) as well as the eigenfrequencies of the guide claw 3 including pump, such characteristics may equally well be determined by experiments. The lower natural frequencies can be calculated for the pump mass incl. water and guide claw 3 supported by a pivot point at the second guide member 11 and the stiffness of the resilient elements 13, defined by the Young's modulus and dimensions. It can be determined by a full 3D model in a Finite Element model as the relative position of suspension point and the pump's center of gravity has an influence on the calculation. At the same time, higher eigenfrequencies above excitation (dependent primarily on the stiffness of pump house and guide claw) can be determined.

An advantageous aim to be met when devising the resilient element 13 is often that the lowest eigenfrequencies are altered to be below an excitation of the pump. Typically, the excitation is due to an impeller passing by an outlet of the pump and this can be calculated based on the number of blades on the impeller and the rotational speed of the impeller. The excitation force with the lowest frequency is in some situations the imbalance exciting with a frequency=rotational speed in rpm/60. As an example, a four poled electrical motor powered by a 50 Hz power supply rotates with 50*2/4*60=1500 rpm. This results in an imbalance excitation at 25 Hz. However, if the variable frequency drive is set to half the rotational speed, the imbalance excitation is changed to 12.5 Hz. E.g. if the impeller has one blade, rotates with 750 RPM as a minimum and the pump has a single outlet, then characteristic vibration has a frequency of 12.5 Hz. Accordingly, when devising the resilient element 13 one aims at assuring the lowest eigenfrequencies are lower than 12.5 Hz.

It has been found in connection with the present invention that a combination of two resilient elements 13 and a stiff connection provided by lower support part 4 and second guide member 11 may lower all the three lowest natural frequencies. Accordingly, in preferred embodiments of the invention, the guide claw 3 comprises two of said first guide members 12 arranged with a distance in between, and a single of said second guide members 11, and the base part 2 comprising two of said upper support parts 5 arranged with a horizontal distance in between them.

During use of the pump support, a pump 1 is arranged on the guide claw 3. As illustrated in FIG. 1 the pump 1 has a pump house, which is configured for housing an impeller. The pump house is arranged on the guide claw 3 by being bolted to the guide claw 3. However, the pump house (or part thereof) and the guide claw 3 may be made integral with each other, e.g. being cast as a single piece.

Figure 2:
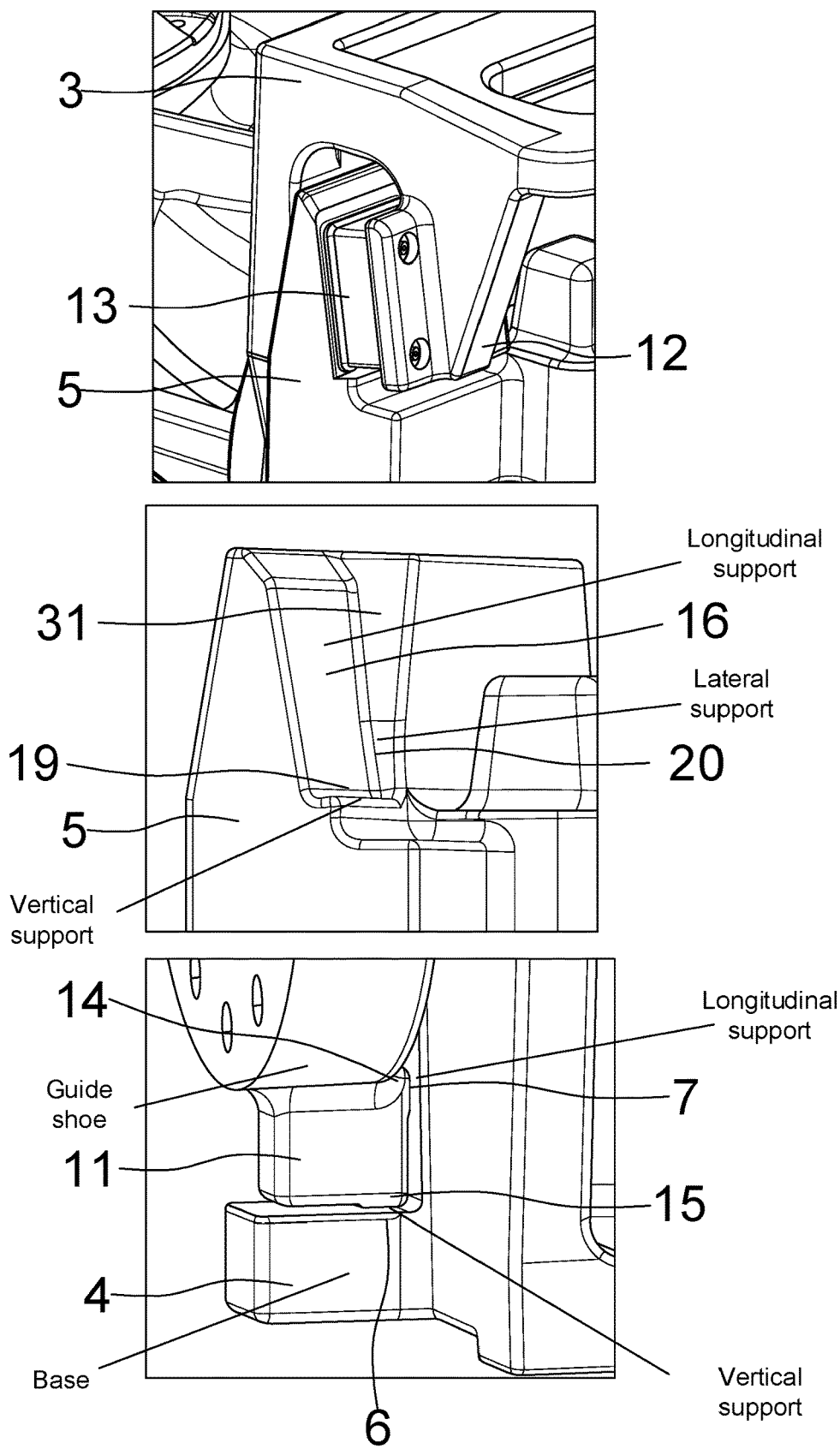
FIG. 2 illustrates in three different views close-up of a first support member and a second support member according to a preferred embodiment of the present invention.

With reference to the lower figure of FIG. 2, the lower support part 4 has a second vertical support surface 7 and a horizontal support surface 6. The second guide member 11 has surfaces mating these support surfaces 6, 7 by the guide claw being provided with a second vertical abutment surface 14 abutting the second vertical support surface 7, so as to support a pump in longitudinal direction towards the base part 2; and a second horizontal abutment surface 15 abutting the first horizontal support surface 6, so as to support the pump in vertical direction towards the lower end 9, when the guide claw 3 is arranged on the base part 2. It is noted that a direct contact is provided between the respective surfaces 7 and 14 and 15 and 6, that is without any resilient material arranged in between.

The support surface 16 is in the embodiment of FIGS. 1 and 2 inclined upwardly towards the end face 17. As perhaps most clearly visible in the middle figure of FIG. 2, the upper support part 5 has a first horizontal support surface 19 configured for supporting the resilient element 13 by abutment in a horizontal plane. This has inter alia the advantage of controlling rotation around a longitudinal axis of the guide claw and pump before it meets the lower support part 4. The first guide member 12 has a vertically inclined abutment surface 18 inclined so as to be parallel with or substantially parallel with the inclination of the support surface 16. The resilient element 13 is arranged in-between the vertically inclined support surface 16 and the vertically inclined abutment surface 18. As illustrated in upper part of FIG. 2, the resilient element 13 in the shown embodiment abuts the support surface 16 and the horizontal support surface 19.

In positioning the guide claw 3 relatively to base part 2, the upper support part 5 comprising a vertical extending lateral guide surface 20 for guiding the resilient element 13 by abutment in lateral direction. By lateral is meant the horizontal direction perpendicular to the longitudinal direction of the pump support. In the embodiment shown, two such vertical extending lateral guide surfaces 20 are arranged on either side of the base part 2. Further, as illustrated an inclined surface 31 is provided above the vertical extending lateral guide surface 20 The inclined surface 21 inclines towards the middle and has the function of positioning the pump in lateral direction with the outlet of the pump aligned with the pipe in the base part 2. Due to the flexibility of the resilient element 13 it is possible to avoid lateral clearance needed in a rigid design due to tolerances. The purpose of the guide bars 22 are to roughly position the pump during lowering in order for the guide claw 3 to connect to the base part 2. The tapered angles upwards on surface 21 and 16 are intended to catch the guide claw during lowering from the rough position and move it into a more precise position where the pipe connections are aligned. The guide rods should preferably not be in contact during normal operation.

The first guide member 12 may be considered as forming a cavity open ended in downward direction configured for receiving the upper support part 5. The base part 2 may at its upper end have a section which is inclined upwardly away from said end face 17. By such a configuration, the upper support part 5 may be considered as forming a tapering element where the tapering may ease receipt of the upper support part in the cavity.

From a practical point of view, it is preferred to fastening the resilient element 13 to the guide claw 3 as shown in FIG. 2 upper part, but it may with respect to its technical purpose equally well be arranged on the base part 2.

The resilient element 13 is typically made partly or fully from an elastomer and/or hyperelastic material. The resilient element 13 is typically formed to have two opposing surfaces and a metal plate 32 may be arranged on one or each of these surfaces to form outer abutment surface(s). Such metal plates preferably are bonded by vulcanization to the surfaces of the elastomer or hyperelastic material. The resilient element 13 is so flexible that when being fully compressed during use, its thickness is reduced by several mm.

Figure 3:
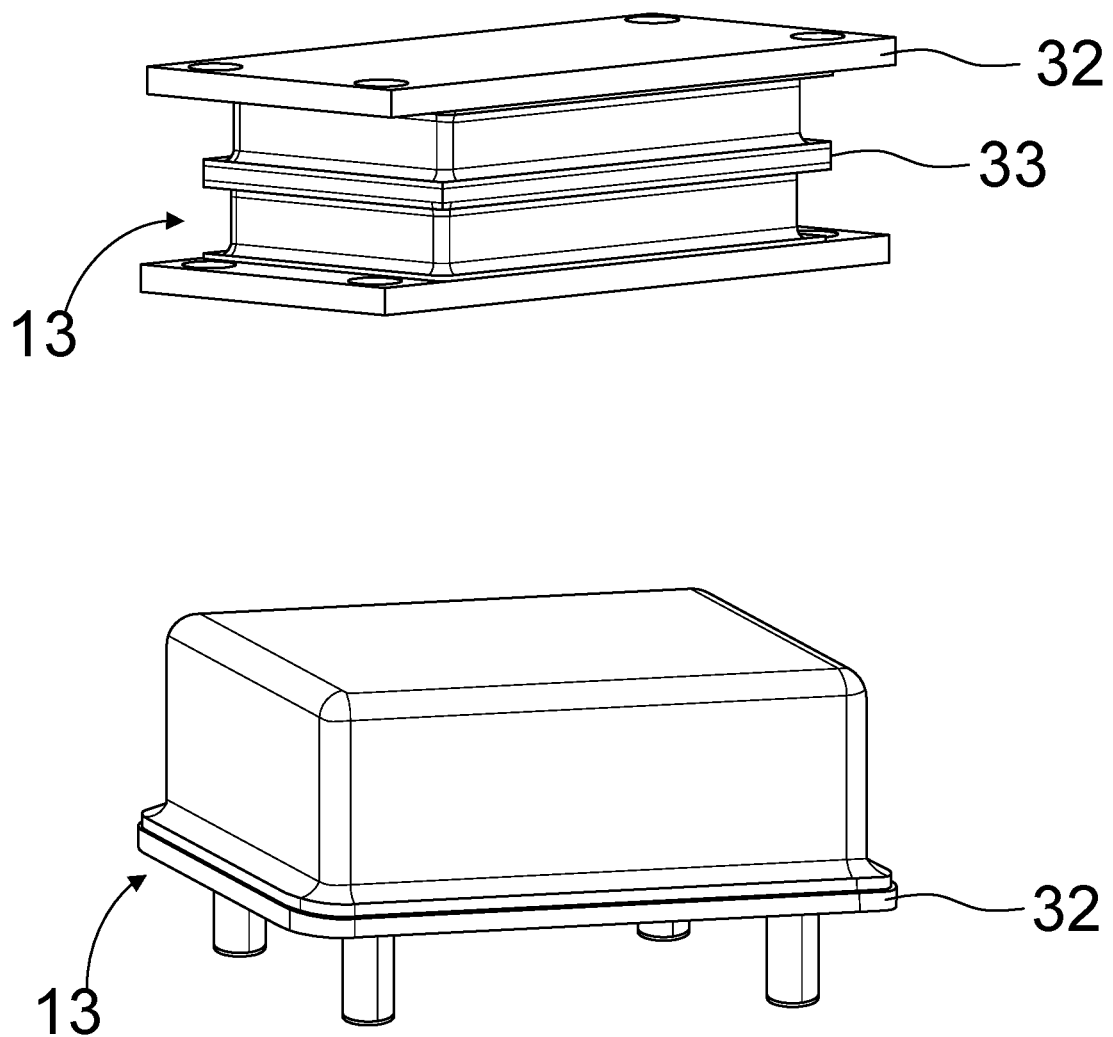
FIG. 3 illustrates two different preferred embodiments of resilient elements according the present invention.

FIG. 3 illustrates two different embodiments of resilient elements 13. The upper part illustrates a sandwiched construction where a metal layer 33 is arranged between two layers of resilient material, and where metal plates are arranged forming outer most surfaces of the resilient element 13. Lower part of FIG. 3 illustrates a construction in which a fastening element is arranged at the bottom of the resilient material, where the fastening element comprising protruding elements fitting into openings provided in the guide claw 3. The protruding elements may be provided with internal or external threads to co-operate with a screw or bolt to provide the fastening.

The above description has been focused towards disclosing the upper support part 5, the second guide member 12 and the resilient element 13 as visible in the figures a similar or even identical set-up is arranged mirrored on the other side of the base part 2 and guide claw 3. As illustrated clearly e.g. in FIGS. 1 and 6b.

Figure 4:
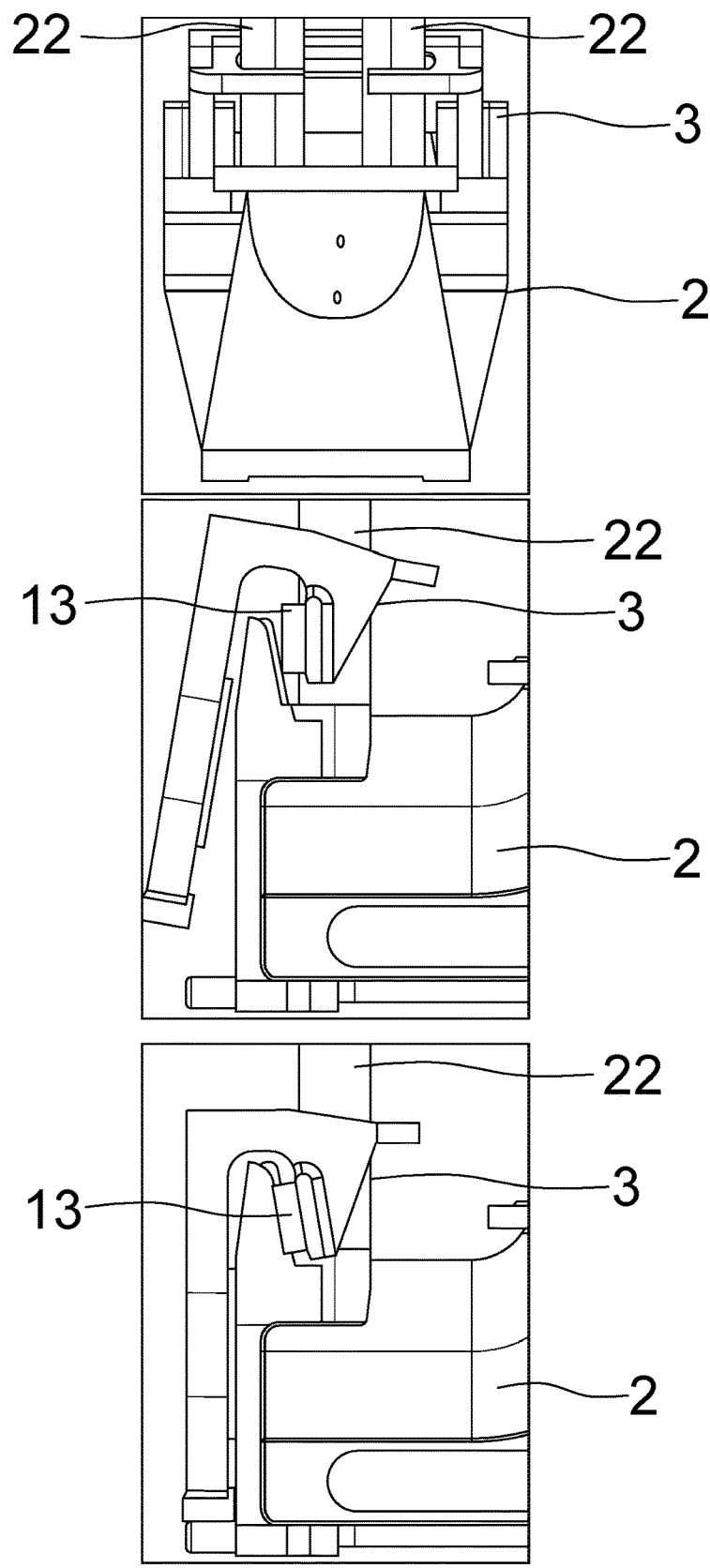
FIG. 4 illustrates in three views how a guide claw can be arranged on the support part according to a preferred embodiment of the invention, upper view illustrates guide bars used for a course guidance of the guide claw downwardly towards the base part, middle view illustrates how upper support part 5, the first guide member 12 and the resilient element 13 co-operates during the downward movement of the guide claw, to position the guide claw on the base part; lower view illustrates the final position of the guide claw on the base part.

Reference is made to FIG. 4 illustrating in three views how a guide claw 3 can be arranged on the base part. It is noted that in FIG. 4 the pump has been omitted for illustration purpose; during use, a pump 1 is arranged on the guide claw so that when the guide claw is maneuvered on the base part, this is typically done with the pump 1 attached to the guide claw 3. From top to bottom, FIG. 4 illustrates the positions of the guide claw during lowering—first guided in rough position by the guide rods (upper part of FIG. 4) and later guided into a more precise position when the guide claw meets the base (lower part of FIG. 4).

As illustrated, the guide claw 3 may have a guide opening 21 configured for co-operating with two vertically arranged guide bars 22 so that the guide claw 3 may slide guided along said guide bars, thereby the guide opening 21 serving as a guide member. The opening 21 as shown in FIG. 1, has an elongated shape with rounded ends. The radius of the rounded ends is selected to mate with the radius of the guide bars 22 (which both are shaped as cylindrical rods) so as to allow movement of the guide claw 13 along the guide bars 22. The base part 2 has fixtures 37 for releasable fixing the guide bars 22 to the base part 2. Such fixtures may each be a protrusion as illustrated in FIG. 1c fitting into the lower end of a guide bar 22 or an open-ended cavity into which the lower end of each guide bars fits.

In other embodiments, a guide member of the guide claw 3 may be arranged between the guide bars 22 instead of the guide members outside the bars or embodiments where guide bars 22 are substituted by wires or embodiments with only one guide bar or wire Accordingly, the guide claw 3 travels along the guide bars 22 in a vertically downward motion which results in that the lower support part 4 is received by the second guide member 11, and the upper support part 5 is received by the first guide member 12. Conversely, in a vertically upward motion of the guide claw 3 the second guide member part 11 depart from lower support part 4 and the first guide member 12 departs from the upper support part 5.

The pump support is designed to provide a pump 1 on a base part 2 so as to pump fluid from an inlet of the pump 1 to another position where the other position is fluidicly connected with the base part 2. Accordingly, the pump support is in the embodiment shown in the figures in a way where the base part 2 has a fluid channel having an inlet arranged in fluid communication via a through-going opening 24 provided in the guide claw 3 or the tubular mount element 34 (see FIG. and accompanying description below). This fluid channel has at the other end an outlet (opening 26 in FIG. 1) to which a pipe or similar can be connected. The guide claw 3 or the tubular mount element 34 is arranged with its through-going opening 24 forming a fluid passage between the pump 1, when arrange on the base part 2, and the fluid channel of said base part 2.

It may be advantageous to provide a sealing of the fluid connection between the guide claw 3 and the base part 2, and this may be provided by the though-going opening 24 of the guide claw 3 is configured for providing a fluid seal against said end face 17 of the base part 2. FIG. 5 shows one example of a sealing in which a seal ring 28 is used. As illustrated, the seal ring 28 is fastened to the guide claw 3 and abuts the surface of the end face 17.

With reference to the embodiment shown in FIG. 6, the outlet section 35 may be configured for providing a fluid seal against said face 17 of the base part 2. The fluid seal may be provided by a seal ring 28.

The seal ring 28 may be fastened by bolts or other suitable fasteners to the guide claw 3, the mount element 34 or the outlet section of the pump 35, but it may also be recessed in a snug fit into the one of these three elements.

Thus, while the problem related exciting one or more eigenfrequency is at least mitigated by a pump support according to the present invention, the acceptance of a movement of the guide claw 3 may generate a sealing problem between the guide claw 3 and the base part 2. As illustrated in FIG. 5, there is a gap 27 in-between the facing surfaces of the guide claw 3 and the base part 2. This gap allows for movement in the resilient element(s) 13. While this might be sealed by a O-ring or another seal ring in compression, it has been found that a particular shaped sealing ring may provide a better sealing during use.

As shown in FIG. 5 the sealing ring 28 is arranged for providing a fluid seal between opposing surfaces of the guide claw 3 and the base part 2. As seen in FIG. 2, the sealing ring 28 is arranged coaxially with the openings in what may be labelled flanges 52 and 53 so as to prevent fluid from leaking out between the flanges 52 and 53.

Figure 5A:
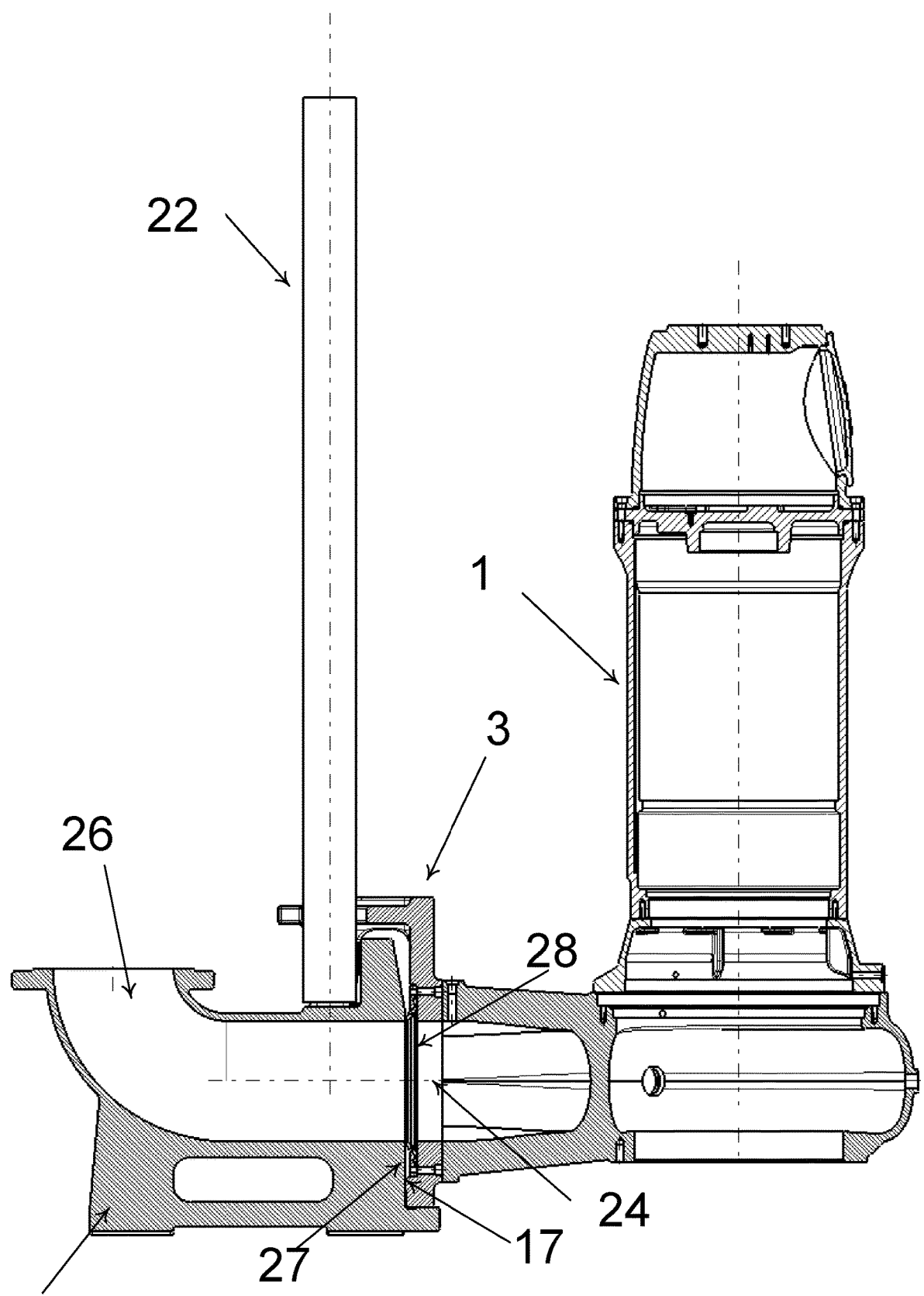
FIGS. 5A and 5B are cross sectional views illustrating a seal ring arranged to seal the connection between the base part and guide claw according to a preferred embodiment of the invention; where
Figure 5B:
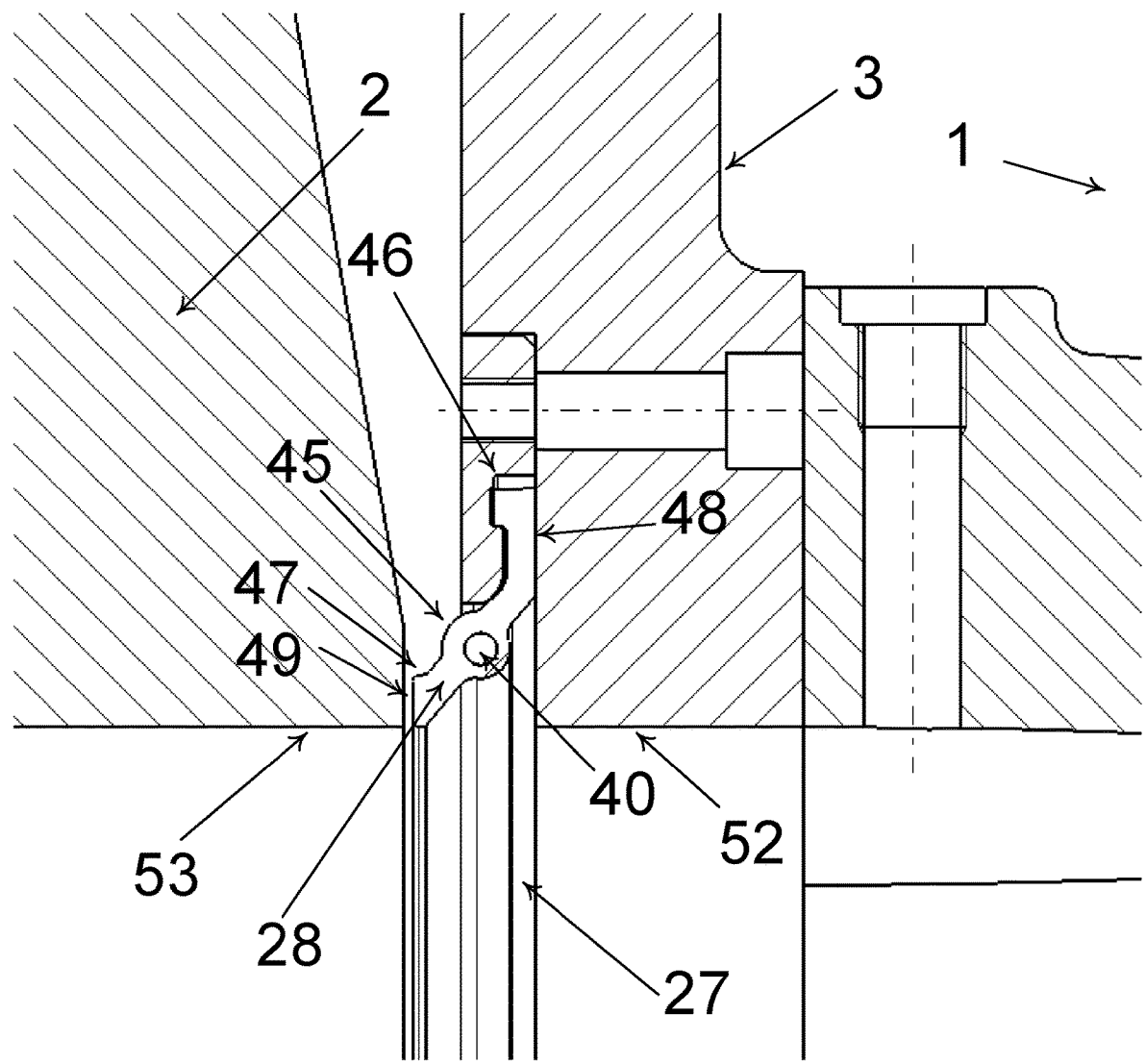

FIG. 5b renders details of the sealing ring even more visible than FIG. 5a. As illustrated, the sealing ring 28 is a tubular element. The sealing ring 28 is referred to as having an axial direction and a radial direction, where the axial direction is aligned with the longitudinal direction of the tubular element and the radial direction is perpendicular to this. It is noted, that although the sealing ring is disclosed as circular, other shapes are considered to be within the scope of the invention.

The sealing ring has a tapering wall member 45 defining an interior funnel-shaped through-going opening extending axially and tapering from a proximal end 46 to a distal end 47. By this, the proximal end 46 is defined as the end of the sealing ring 28 having the largest opening and the distal end 47 as the opposite end. The sealing ring 28 is preferably arranged so that the narrowing direction of the tapering wall member is in the same direction as the fluid flows.

The tapering wall member 45 is made from a resilient material to provide an axial deflection of the tapering wall member 45 when exposed to an axial force. This axial force is typically provided by a fluid passing through the sealing ring in the tapering direction. Since this fluid typically has a higher pressure than the pressure outside the sealing ring 28, the pressure difference provides an axial force on the interior of the sealing ring. It is noted, that a pressure is a force acting perpendicular to a surface, thus the pressure difference provides both an axial force and a radial force (when the pressure is considered in these two geometrical components). The radial force will be discussed below with respect to a reinforcement member.

The sealing ring 28 has a first abutment surface 48 provided at the proximal end for providing a fluid seal when abutting a surface of one of the flanges 52, 53. This first abutment surface 48 is preferably shaped so as to conform geometrically with the shape of the surface of the flange to abut. In the embodiment shown in FIG. 5, the surface of the flange 53 is flat and radially extending, and the first abutment surface 48 is cantered (shaped) relatively to the proceed of tapering wall member 45 to form a radially extending flat surface.

A second abutment surface 49 is provided at the distal end 47 for providing a fluid seal when abutting a surface of another one of the flanges 52, 53. As for the first abutment surface 48, the second abutment surface 49 is also preferably shaped so as to conform geometrically with the shape of the surface of the flange to abut, which also for the second abutment surface of the shown embodiment means that the surface is cantered (shaped) relatively to the proceed of the tapering wall member 45 to form a radially extending flat surface.

The pressure difference across the sealing ring 28 provides axial force as well as a radial force. While the axial force is used to provide or increase the sealing capabilities of the sealing ring, radial forces have a tendency to distort the sealing ring 28 in an unfavourable manner. In order to increase the sealing ring 28's mechanical stability in radial direction, a reinforcement member 40 made from a stiffer material than the material of the tapering wall member 45 is applied. The reinforcement member 40 is in the shown embodiment shaped as a closed ring-shaped element with an axial extension being smaller than the axial distance between the proximal end 46 and the distal end 47. Further, the reinforcement member 40 can be arranged in or on the tapering wall member 45. In the shown embodiment, the reinforcement member 45 is positioned embedded inside the tapering wall member 45 at an axial position between proximal end 6 and the distal end 47. By providing the sealing ring 28 with such a relatively stiffer reinforcement member 40, at least some of the radial forces will be taken up by this member, which limits or even prevents outward deflection of at least a part of the tapering wall member 45 when a pressure difference is applied across the tapering wall member 45. It is noted that in the disclosed embodiment, the radial force is considered to acts radial outwardly, but in case of radial inwardly acting forces, the reinforcement member limits or even prevents inward deflection of at least a part of the tapering wall member 45.

As shown in FIG. 5b, the seal ring 28 may be dimensioned so that a gap 27 is present between the second abutment surface 39 of the sealing ring and the surface of the base part 2. It is however often preferred to dimension the seal ring so that such a gap 27 is not present. Such gap 27 forms a void as an unsealed passage is provided to ease assembly of the pump support or emerges do to tolerances or movement between the flanges as will be disclosed in the following. As disclosed above, the guide claw 3 of the pump support is lowered onto the base part 2. This lowering typically benefit from a high flexibility of the sealing ring 28 reducing the risk of the guide claw getting stuck during lowering of the guide claw 3 onto the base part 2 at least in order not to damage the sealing ring 1. Further, since the pump support typically is used in an environment (e.g. a fully submerged pump assembly) where some leakage is acceptable during start-up of the pumping action, and the pump quickly provides a pressure in the fluid providing an axial force on the sealing ring 28, the gap 27 will during start-up automatically close due to the axial deflection of the sealing ring 28 caused by the pressure difference. Such a gap at start up may even be found advantageous, since it allows for escape of air trapped inside the pump house.

Figure 6A:
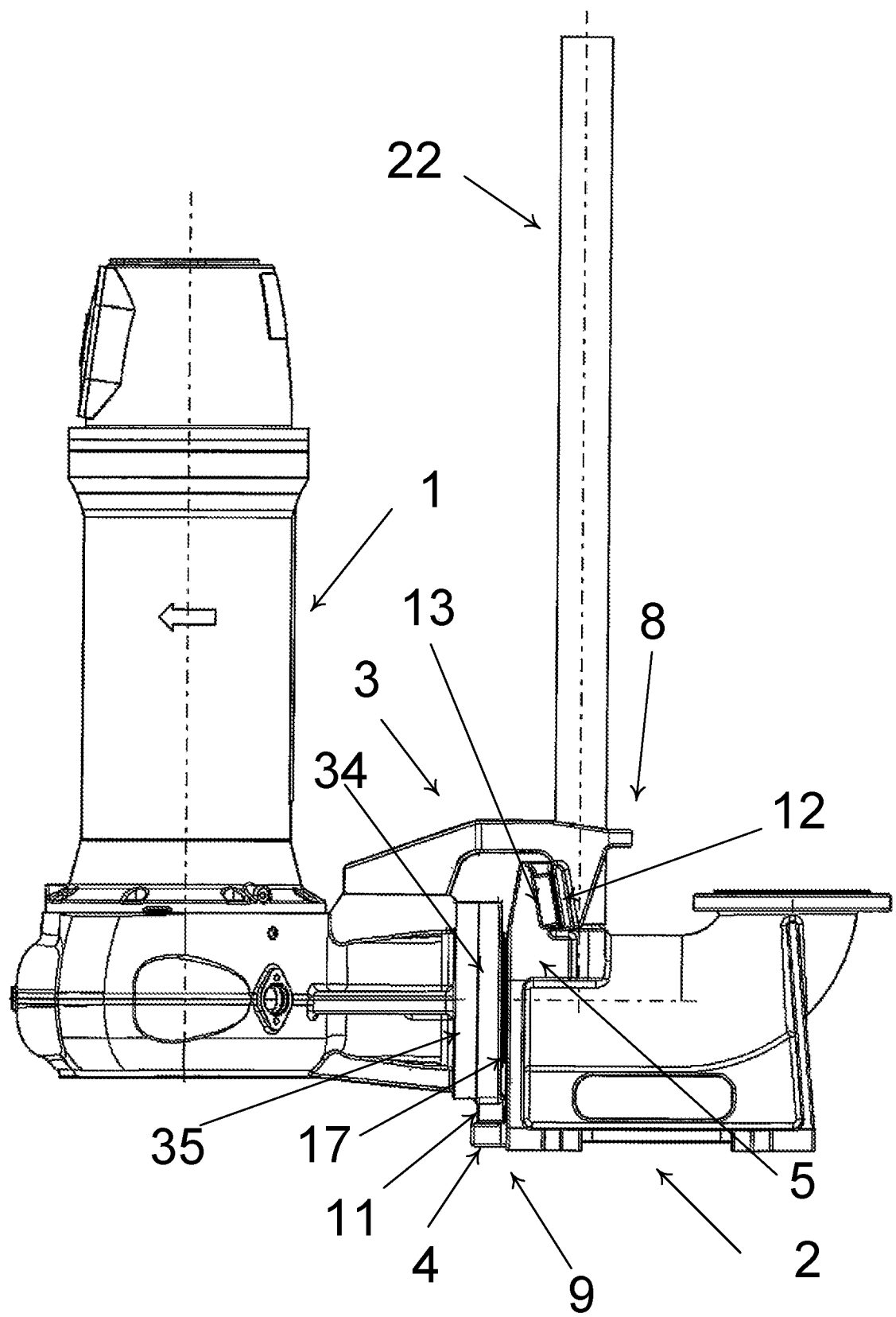
FIGS. 6a, 6b and 6c illustrate another preferred embodiment of a pump support according to the present invention; where
Figure 6B:
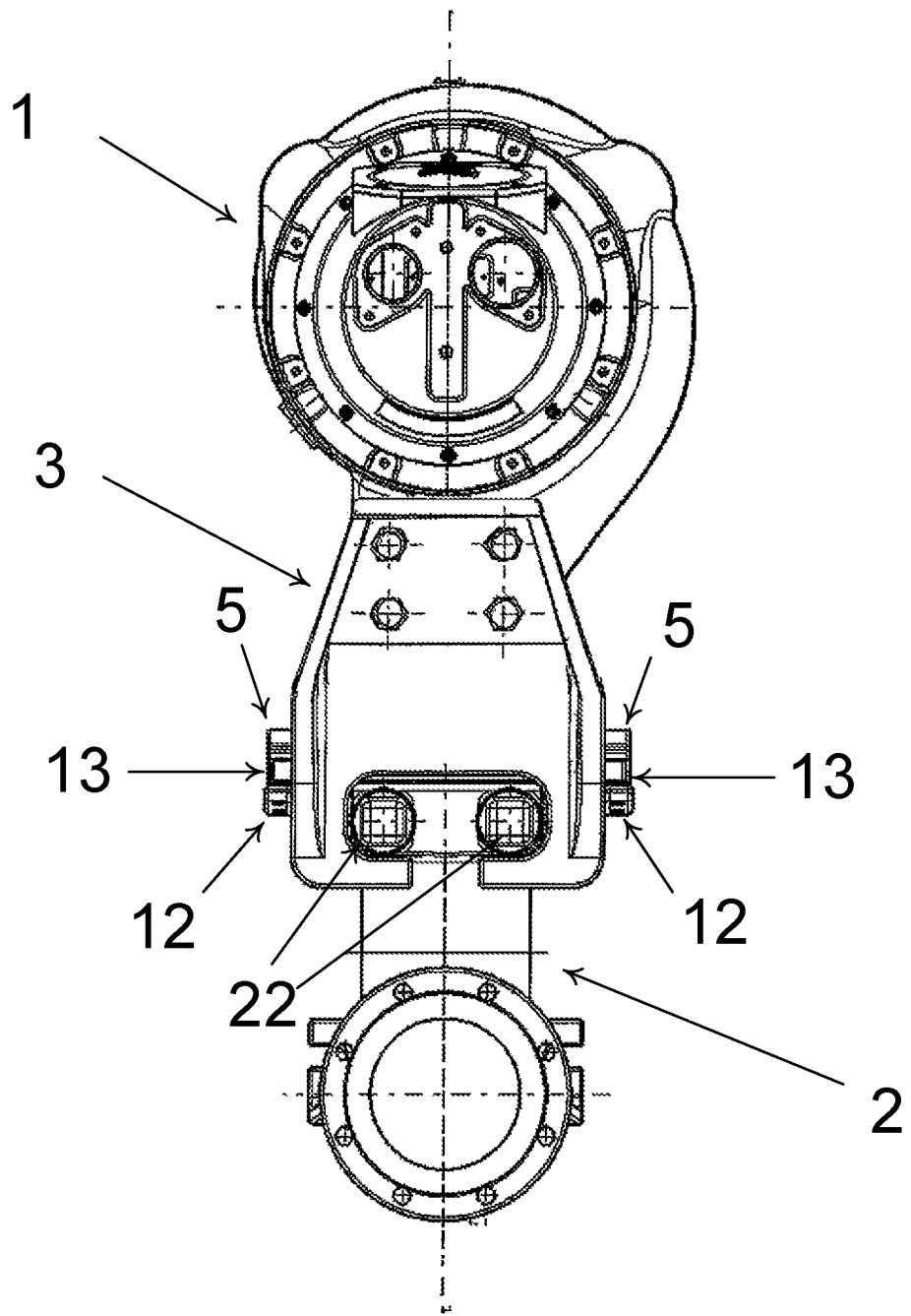
Figure 6C:
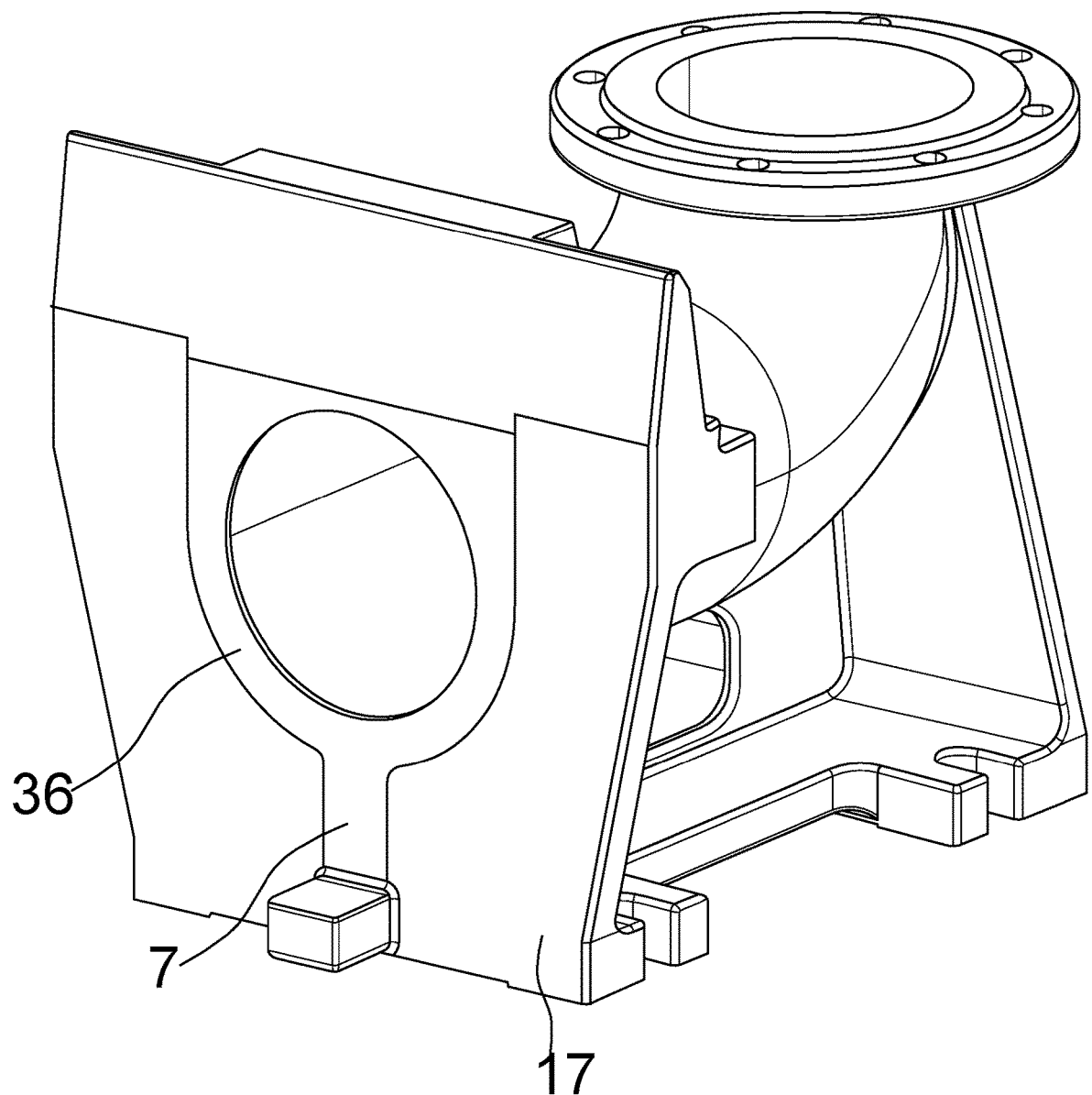

FIGS. 6*a-c* illustrate another embodiment according to the invention. In this embodiment guide claw 3 comprises the second guide member 11 arranged at a lower position of the guide claw 3 and being configured to be received by said lower support part 4. One possible position of the second guide member is on a tubular mount element 34. This tubular mount element is configured to be arranged at an outlet of the pump 1, and the second guide member 11 arranged at a lower position of the guide claw 3 and is configured to be received by said lower support part 4. In the embodiment shown, the tubular mount element 34 is mounted on the outlet of the pump by bolts (not illustrated).

In a further embodiment (not illustrated) the second guide member 11 is arranged at a lower position of and outlet section 35 of the pump 1 and is configured to be received by said lower support part 4. In such embodiments, the tubular mount element 34 may be left out. As illustrated in FIG. 6*c*, the surface, sealing face 36, to be abutted by the seal ring 28 may be elevated from end face 17. While this is particular useful in connection with the embodiment of FIG. 6, such elevation may advantageously be applied in other embodiments as well. Further, to allow for movement of the seal ring, the vertical support surface 7 may be raised relatively to the sealing surface 36 (not shown in FIG. 6*c*).

As shown in FIG. 6*a*, at least a part of the guide claw 3 extends from said pump. With reference to FIGS. 6*a* and 6*b* in combination, it can be realized that the guide claw 3 is mounted on the upper side of the outlet pipe of the pump 1. In the shown embodiment, the guide claw 3 is bolted to the outlet pipe by four bolts. However, the guide claw 3 could be made integral with the outlet pipe.

Using of the pump support typically involves the following steps. If not already provided, the base part 2 is mounted on a pump support carrying member which may be a floor of a pumping well or other building construction elements.

After the pump 1 has been provided with a guide claw 3 (or vice versa), the guide claw 3 is lowered toward the base part 2 by use of the guide bars 22 disclosed above until the lower support part 4 has received and support said second guide member 11, and until the upper support part 5 is received by the first guide member 12 with the resilient element 13 in between the upper support part 5 and the first guide member 12.

When the pump 1 is to be dismantled is in principle the reverse of mounting the pump and involves consequently, the step of raising the guide claw 3 away from the base part 2.

While the lowering or raising of the pump with guide claw can be carried out without use of the guide bars, such lowering and raising are found to be eased by applying the guide bars 22. It is furthermore noted that the guide bars 22 typically are arranged prior to the lowering or raising and removed subsequent to the lowering or raising, but they may be left on the base part 2. In situations, where the lowering and raising the pump are done regularly to clean the pump, e.g. due to operating in waste water containing different substances that will cover the pump and/or even block the pump and/or its inlet, it is generally preferred to make the guide bars 22 a part of the fixed installation, that is not removing them from the base part 2.

As shown herein, the guide claw 3 and at least the front part of the base 2 part which co-operates with the guide claw 3 is preferably made symmetrical with respect to a longitudinal and vertical plane passing through a geometrical centrum of the through going opening 24.

Figure 7A:
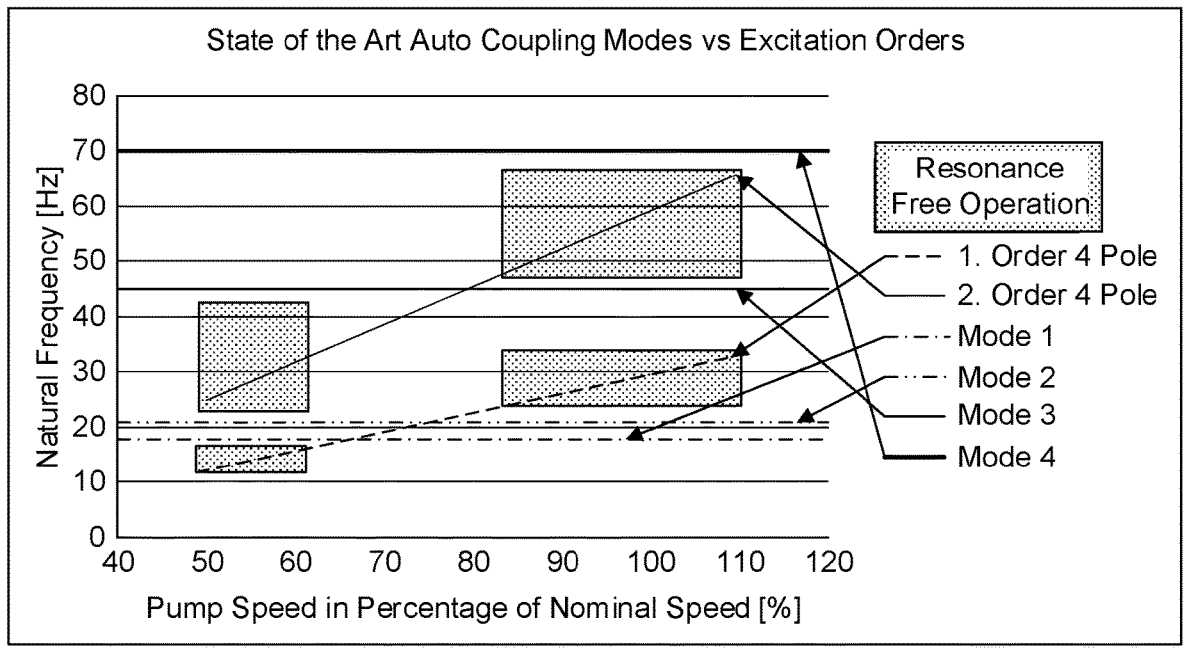
FIGS. 7A and 7B illustrate results of a comparative study resonance free operation of a state of the art auto coupling and of an embodiment according to the present invention.
Figure 7B:
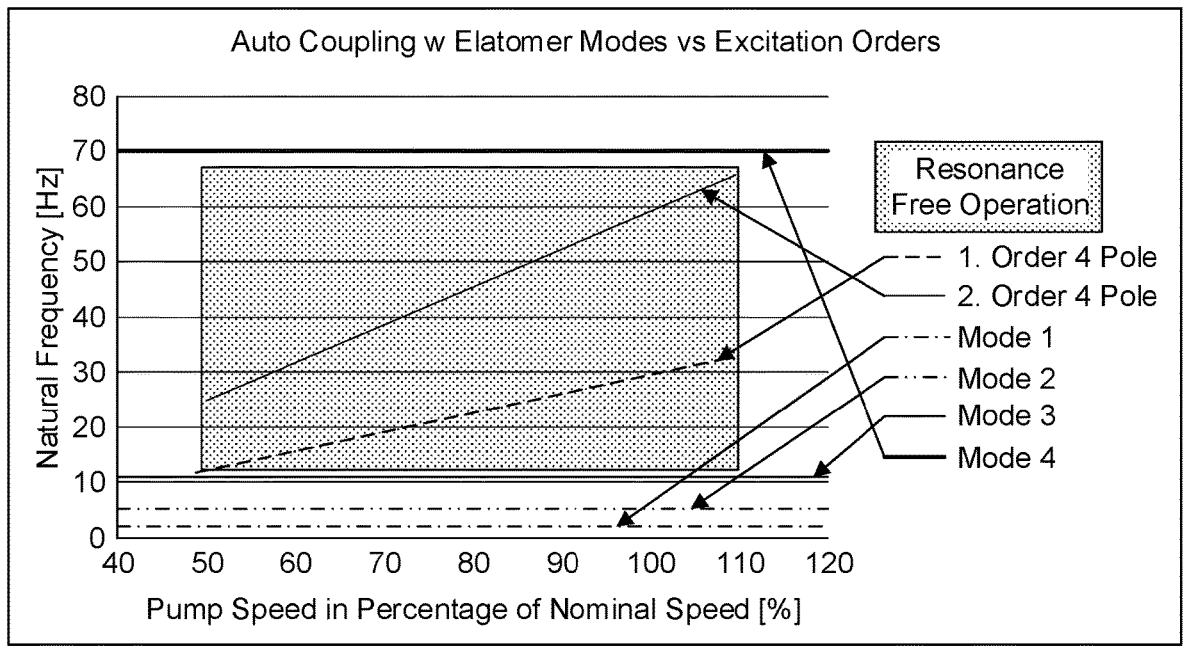

Description to FIG. 7:

In state of the art auto couplings resonances cannot be avoided in the full speed range when using Variable Frequency Drive (VFD), leading to too high vibration levels that can cause noise issues and damage to the pump itself and auxiliary equipment such as wells, pipes and valves. A common way to avoid resonances is to skip the speed ranges with resonances, but this is limiting the energy saving expected from using the VFD. In the charts in FIG. 7 the resonances are illustrated by plotting the excitation orders and natural frequency modes as function of the relative pump speed and the resonances are found where the excitation orders cross the natural frequency modes. The chart in FIG. 7*a* is for a state of the art coupling having 3 resonances in the speed range 50-110% of nominal speed, limiting the available speed range to two separated speed ranges The objective of the invention is to avoid resonances in a wide operating range at least down to 50% of nominal speed when the pump is operated with variable speed using a variable frequency drive (VFD). The chart in FIG. 7*b* is for an auto coupling according to the invention with no resonances within the speed range 50-110% of nominal speed. The full speed range is available without resonances making it possible to utilize the full energy saving potential of the VFD without resonances.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE NUMBERS USED

1 Pump
2 Base part
3 Guide claw
4 Lower support part
5 Upper support part
6 Second horizontal support surface
7 Second vertical support surface
8 Upper end
9 Lower end 11 Second guide member
12 First guide member
13 Resilient element
14 Second vertical abutment surface
15 Second horizontal abutment surface
16 Support surface
17 End face
18 Vertically inclined abutment surface
19 First horizontal support surface
20 Vertical extending lateral guide surface
21 Guide opening
22 Guide bars
23 Fluid channel
24 Though-going opening
25 Indentation
26 Opening
27 Gap
28 Seal ring
30 Electrical motor
31 Inclined surface
32 Metal plate
33 Metal layer
34 Mount element
35 Outlet section of pump
36 Sealing face
37 Fixtures
40 Reinforcement member
45 Tapering wall member
46 Proximal end
47 Distal end
48 First abutment surface
49 Second abutment surface
52 Flange (of guide claw)
53 Flange (of base part)

What is claimed is:

1. A pump support comprising:
   a base part having a lower end and an upper end, said base part comprising an end face; and
   a guide claw adapted for carrying a pump and being configured for releasably arranging the pump on the base part at the end face, the guide claw comprising a first guide member, wherein the base part comprises:
   a lower support part at the lower end, the lower support part being configured to non-resiliantly support the pump in a longitudinal direction towards the base part and in a vertical direction towards the lower end; and
   an upper support part having a support surface at the upper end configured to receive said first guide member and supporting said first guide member in an abutting engagement with a resilient element positioned in between the upper support part and the first guide member, so that with gravity acting on the pump, the guide claw is resiliently supported at the support surface of the upper support part.

2. A pump support according to claim 1, wherein said guide claw comprises a second guide member arranged at a lower position of the guide claw and being configured to be received by said lower support part.

3. A pump support according to claim 1, further comprising a tubular mount element configured to be arranged at an outlet of the pump, said tubular mount element comprising a second guide member arranged at a lower position of the guide claw and being configured to be received by said lower support part.

4. A pump support according to claim 3, wherein a second guide member is arranged at a lower position of an outlet section of said pump and is configured to be received by said lower support part.

5. A pump support according to claim 1, wherein at least a part of the guide claw extends from said pump.

6. A pump support according to claim 5, wherein the guide claw is mounted on or made integral with an upper side of an outlet pipe of said pump.

7. A pump support according to claim 1, wherein:
   the guide claw comprises two of said first guide members arranged with a distance in between them, and a single of said first guide members; and
   the base part comprises two of said upper support parts arranged with a horizontal distance in between them.

8. A pump support according to claim 1, wherein the support surface is vertical or forms an angle relative to vertical by an amount of less than 15 degrees and larger than 0 degrees.

9. A pump support according to claim 1, wherein a pump is arranged on the guide claw, the pump comprising a pump house configured for housing an impeller and being arranged on said guide claw.

10. A pump support according to claim 1, wherein:
    the lower support part includes a second vertical support surface and a second horizontal support surface; and
    the second guide member of the guide claw comprises:
    a second vertical abutment surface configured to abut the second vertical support surface, so as to support the pump in longitudinal direction towards the base part; and
    a second horizontal abutment surface configured to abut the second horizontal support surface, so as to support the pump in vertical direction towards the lower end.

11. A pump support according to claim 1, wherein:
    the support surface is inclined upwardly towards the end face; and
    the first guide member includes a vertically inclined abutment surface inclined so as to be parallel with or substantially parallel with the inclination of the support surface;
    the resilient element is arranged in-between the support surface and the vertically inclined abutment surface.

12. A pump support according to claim 1, wherein the upper support part comprises a first horizontal support surface configured for supporting the resilient element by abutment in a horizontal plane.

13. A pump support according to claim 1, wherein:
    the upper support part comprises a vertical extending lateral guide surface for supporting the resilient element by abutment in lateral direction; and
    lateral is a horizontal direction perpendicular to a longitudinal direction of the pump support.

14. A pump support according to claim 1, wherein:
    the first guide member forms a cavity open ended in downward direction configured for receiving the upper support part; and
    the base part at its upper end is inclined upwardly away from said end face.

15. A pump support according to claim 1, wherein the guide claw is made integral with or releasable connected to the pump housing.

16. A pump support according to claim 1, wherein the resilient element is attached to one of the guide claw or the base part.

17. A pump support according to claim 1, wherein:
the resilient element is made partly or fully from an elastomer, hyperelastic material with metal plates forming one or both outer abutment surfaces; and
said metal plates are bonded by vulcanization.

18. A pump support according to claim 1, wherein the guide claw comprising one or more guide openings configured for cooperating with one or more vertically arranged guide bars so that the guide claw may slide guided along said guide bar(s):
in a vertically downwardly motion so that the lower support part receives said second guide member, and the upper support part receives said first guide member; and
in a vertically upward motion so that the second guide member departs from the lower support part and the first guide member departs from the upper support part.

19. A pump support according to claim 1, wherein:
said base part comprises a fluid channel having an inlet arranged in fluid communication via a through-going opening provided in the guide claw or a tubular mount element configured to be arranged at an outlet of the pump and at another end forming an outlet;
said guide claw or said tubular mount element being arranged with a through-going opening forming a fluid passage between the pump, when arranged on the base part, and the fluid channel of said base part.

20. A pump support according to claim 19, wherein the though-going opening of the guide claw is configured for providing a fluid seal against said end face of the base part.

21. A pump support according to claim 1, wherein:
a second guide member is arranged at a lower position of an outlet section of said pump and is configured to be received by said lower support part; and
said outlet section is configured for providing a fluid seal against said face of the base part.

22. A pump support according to claim 21, wherein the fluid seal is provided by a seal ring.

23. A method of providing a pump support comprising: a base part having a lower end and an upper end, said base part comprising an end face; a guide claw adapted for carrying a pump and being configured for releasably arranging the pump on the base part at the end face, the guide claw comprising a first guide member, wherein the base part comprises: a lower support part at the lower end, the lower support part being configured to non-resiliently support the pump in a longitudinal direction towards the base part and in a vertical direction towards the lower end; and an upper support part having a support surface at the upper end configured to receive said first guide member and supporting said first guide member in an abutting engagement with a resilient element positioned in between the upper support part and the first guide member, so that with gravity acting on the pump, the guide claw is resiliently supported at the support surface of the upper support part, wherein the base part is mounted on a pump support carrying member, the method comprising the steps of:
providing a pump with the guide claw; and
lowering said guide claw toward the base part to provide that the lower support part has received and support said second guide member, and the upper support part has received said first guide member with a resilient element in between the upper support part and the first guide member.

24. The method according to claim 23, wherein:
the guide claw comprises one or more guide openings configured for cooperating with one or more vertically arranged guide bars so that the guide claw may slide guided along said guide bar(s): in a vertically downwardly motion so that the lower support part receives said second guide member, and the upper support part receives said first guide member; and in a vertically upward motion so that the second guide member departs from the lower support part and the first guide member departs from the upper support part; and
said lowering is carried out along the guide bars, and the guide bars are arranged prior to the lowering.

25. A method of dismantling a pump provided with a guide claw from a base part of a pump support comprising: a base part having a lower end and an upper end, said base part comprising an end face; a guide claw adapted for carrying a pump and being configured for releasably arranging the pump on the base part at the end face, the guide claw comprising a first guide member, wherein the base part comprises: a lower support part at the lower end, the lower support part being configured to non-resiliently support the pump in a longitudinal direction towards the base part and in a vertical direction towards the lower end; and an upper support part having a support surface at the upper end configured to receive said first guide member and supporting said first guide member in an abutting engagement with a resilient element positioned in between the upper support part and the first guide member, so that with gravity acting on the pump, the guide claw is resiliently supported at the support surface of the upper support part, the method comprising:
raising said guide claw away from the base part.

26. The method according to claim 25, wherein:
the guide claw comprises one or more guide openings configured for cooperating with one or more vertically arranged guide bars so that the guide claw may slide guided along said guide bar(s): in a vertically downwardly motion so that the lower support part receives said second guide member, and the upper support part receives said first guide member; and in a vertically upward motion so that the second guide member departs from the lower support part and the first guide member departs from the upper support part; and
said raising is carried out along the guide bars, and the guide bars are arranged prior to the raising.

* * * * *